US00RE42071E

(19) United States
(12) Reissued Patent
Nakayama

(10) Patent Number: US RE42,071 E
(45) Date of Reissued Patent: Jan. 25, 2011

(54) COLOR IMAGE FORMING APPARATUS AND METHOD OF CONTROLLING SAME

(75) Inventor: Toshiki Nakayama, Shizuoka (JP)

(73) Assignee: Canon Kabushiki Kaisha, Tokyo (JP)

(21) Appl. No.: 12/421,524

(22) Filed: Apr. 9, 2009

Related U.S. Patent Documents

Reissue of:
(64) Patent No.: 7,203,434
Issued: Apr. 10, 2007
Appl. No.: 10/967,354
Filed: Oct. 19, 2004

(30) Foreign Application Priority Data

Oct. 27, 2003 (JP) ..... 2003-366316

(51) Int. Cl.
*G03G 15/00* (2006.01)

(52) U.S. Cl. ..... 399/49; 399/15; 399/45; 399/81

(58) Field of Classification Search ..... 399/15, 399/44, 45, 49, 81; 347/19; 358/406, 504
See application file for complete search history.

(56) References Cited

U.S. PATENT DOCUMENTS

| | | | |
|---|---|---|---|
| 5,887,223 | A | 3/1999 | Sakai et al. |
| 6,731,889 | B2 | 5/2004 | Nakayama |
| 6,853,815 | B2 | 2/2005 | Tezuka et al. |
| 2003/0049040 | A1 | 3/2003 | Tezuka et al. |
| 2003/0085941 | A1 | 5/2003 | Tezuka et al. |
| 2003/0091357 | A1 | 5/2003 | Maebashi et al. |
| 2005/0117927 | A1 | 6/2005 | Tanaka et al. |
| 2005/0191071 | A1 | 9/2005 | Katayanagi et al. |

FOREIGN PATENT DOCUMENTS

| | | |
|---|---|---|
| JP | 2001-183592 | 7/2001 |
| JP | 2003-84532 | 3/2003 |
| JP | 2003076077 A | 3/2003 |
| JP | 2003-107813 | 4/2003 |
| JP | 2003-274204 | 9/2003 |

OTHER PUBLICATIONS

Office Action dated Sep. 18, 2009 in JP 2003–36616.

*Primary Examiner*—Sophia S Chen
(74) *Attorney, Agent, or Firm*—Fitzpatrick, Cella, Harper & Scinto

(57) ABSTRACT

An image of stabilized tint is output even if a supplied transfer medium is changed to a transfer medium of a different surface gloss or type of paper. If the supplied transfer medium has changed, the tint of a corrective image formed on the transfer medium is sensed, a tint correction of an image forming portion is performed based upon result of sensing, and corrective data of the tint correction and information relating to the transfer medium is stored. If a change of the transfer medium is sensed subsequently, a determination is made as to whether the transfer medium is substantially the same transfer medium, based upon the stored information relating to the transfer medium. If the transfer medium is substantially the same, then image processing is executed based upon the stored corrective data.

27 Claims, 12 Drawing Sheets

COLOR IMAGE FORMING APPARATUS AND METHOD OF CONTROLLING SAME

Matter enclosed in heavy brackets [ ] appears in the original patent but forms no part of this reissue specification; matter printed in italics indicates the additions made by reissue.

*This application is a reissue of U.S. Pat. No. 7,203,404, which issued from application Ser. No. 10/967,354 filed Oct. 19, 2004.*

FIELD OF THE INVENTION

This invention relates to a technique for sensing the tint of a corrective image formed on a transfer medium and applying a tint correction in image forming means based upon the result of sensing.

BACKGROUND OF THE INVENTION

The density of an image obtained in an electrophotographic image forming apparatus fluctuates if there is a change in the environment or a change in the components of the apparatus owing to prolonged use. In the case of a color image forming apparatus in particular, there is the danger that color balance may be upset even by a small fluctuation in density. This makes it necessary to maintain a constant density-tone characteristic at all times.

Accordingly, in an electrophotographic color image forming apparatus, means are provided for toner of each color, namely with correction means for correcting process conditions such as various amounts of exposure and developing bias conforming to absolute humidity, and tone correction means such as a look-up table (LUT). On the basis of absolute humidity measured by a temperature & humidity sensor, the process conditions and optimum value for tone correction are selected.

Further, a toner patch for sensing density is formed on an intermediate transfer body or drum using tone of each color so as to obtain a constant density-tone characteristic, the density of the unfixed toner patch is sensed by a density sensor for sensing the unfixed patch, and density is controlled by applying feedback to the process conditions such as amount of exposure and developing bias based upon the result of sensing, whereby a stabilized image is obtained.

However, density control using a sensor for sensing unfixed toner is such that a toner patch is sensed upon being formed on an intermediate transfer medium or drum. No control is exercised with regard to a change in color balance of the image ascribable to subsequent transfer and fixing to a transfer medium. In general, color balance varies also depending upon the transfer efficiency with which a toner image is transferred to a transfer medium and the temperature and pressure applied by fixing. Such a variation cannot be dealt with by density control that employs the aforementioned density sensor for sensing an unfixed patch.

An image forming apparatus proposed heretofore (for example, see the specification of Japanese Patent Application Laid-Open No. 2003-76077) is provided with a density or chromaticity sensor (referred to as a "color sensor" below) for sensing the density of a single-color toner image or chromaticity of a full-color image on a transfer medium following transfer and fixing, forms a color toner patch (referred to simply as a "patch" below) for controlling density or chromaticity, and feeds the sensed density or chromaticity back to the process conditions such as the amount of exposure and look-up table (LUT), thereby controlling density or chromaticity of the final output image formed on the transfer medium.

Further, in an ink-jet printer, color balance varies depending upon a temporal change in amount of ink discharged, a difference in environment and individual differences among ink cartridges, and therefore the density-tone characteristic cannot be held constant. Accordingly, in a printer proposed heretofore, a color sensor is placed in the vicinity of the printer output section, the density or chromaticity of a patch on a printing medium is sensed and density or chromaticity is controlled.

RGB data representing an image to be output in an image forming apparatus is converted by a color matching table to a device RGB signal handled by each type of image forming apparatus, the device RGB signal is converted by a color separation table to a YMCK signal that conforms to the toner or ink color, and the YMCK signal is converted by a calibration table to a Y'M'C'K' signal that has undergone a density-tone characteristic correction specific to each image forming apparatus. Several methods of controlling density or chromaticity are conceivable. For example, an image of a desired tint can be obtained by correcting the calibration table based upon measured density or by correcting the color matching table or color separation table based upon measured chromaticity.

However, in a case where an image is fixed to each transfer medium using a multiple transfer media of different gloss and paper type in a conventional color image forming apparatus after application of "color stabilization control", which includes forming a patch on a transfer medium, sensing the density or chromaticity of the patch and controlling density or chromaticity of the final output image based upon the result of sensing, whereby an image of stabilized tint is obtained, a problem which arises is that the tint of the toner of the fixed image differs depending upon the transfer medium. This problem becomes pronounced particularly at highlight portions of an image where the amount of toner build-up on the transfer medium is small.

Further, a color image forming apparatus such as a laser printer or copier is equipped with a plurality of paper-feed trays, a port for manual insertion of paper and paper-feed options. Since transfer media of multiple types usually are handled, this is an environment readily susceptible to the above problem. In other words, carrying out color stabilization control every time with the user being aware of the type of transfer medium is difficult in a case where use is made of a single image forming apparatus via a network. This subjects the user to a great burden. Consequently, such control is not realistic.

Furthermore, owing to an increase in the frequency with which color stabilization control is performed, intervals during which printing cannot be executed increase in length and there is also an increase in transfer media on which patches are printed.

SUMMARY OF THE INVENTION

Accordingly, an object of the present invention is to output an image of stabilized color tint even if a supplied transfer medium is changed to a transfer medium of a different gloss or type of paper.

Accordingly, an object of the present invention is to output an image of stabilized color tint without exercising color stabilization control each time in a case where a supplied transfer medium is changed to a transfer medium of a different gloss or type of paper.

In accordance with an embodiment of the present invention, the foregoing objects are attained by providing a method of controlling an image forming apparatus for forming an image on a transfer medium, comprising: a determination step of determining that a characteristic of the transfer medium has changed; a step of executing a density sensing sequence based upon the determination of the change in the characteristic of the transfer medium, the density sensing sequence including a sensing step of forming an image, which is for sensing density, on the transfer medium, and sensing this density-sensing image on the transfer medium; and a step of deciding image forming conditions of the image forming apparatus based upon result of sensing density in the density sensing sequence.

Further, in accordance with an embodiment of the present invention, the foregoing objects are attained by providing an image forming apparatus comprising: an image forming unit adapted to form an image on a transfer medium; a sensor adapted to sense an image, which is for sensing density, formed by the image forming unit; a control unit adapted to decide image forming conditions of the image forming unit based upon result of sensing by the sensor; and a determination unit adapted to determine that a characteristic of the transfer medium has changed; the apparatus executing a density sensing sequence based upon result of determination by the determination unit, the density sensing sequence including a sensing step of forming the image, which is for sensing density, on the transfer medium, and sensing this density-sensing image on the transfer medium using the sensor.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments for working the present invention will be described in detail with reference to the drawings.

[First Embodiment]

Figure 1:
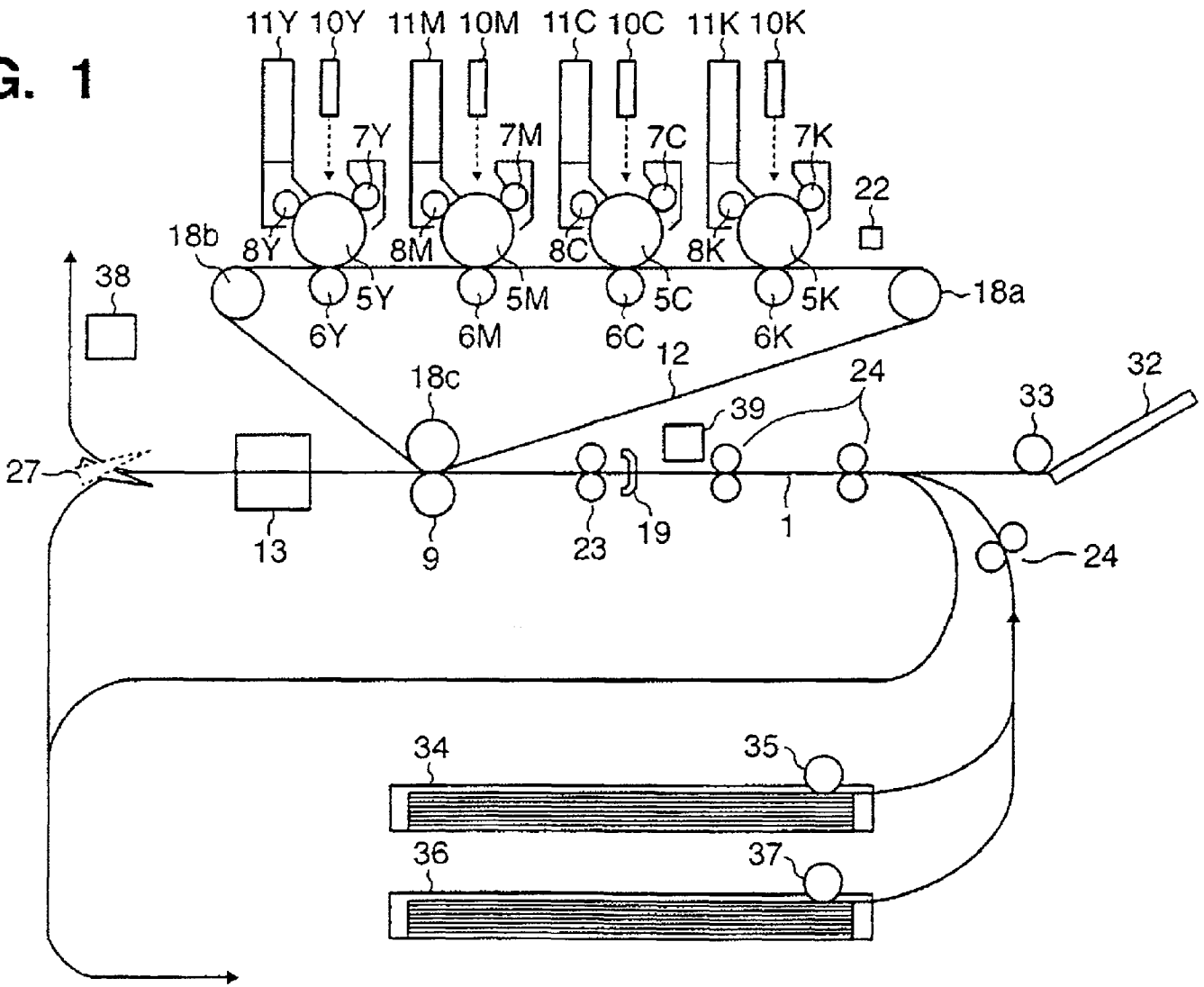
FIG. 1 is a diagram schematically illustrating the structure of an image forming apparatus according to a first embodiment of the present invention.

FIG. 1 is a diagram schematically illustrating the structure of an image forming apparatus according to a first embodiment. This embodiment illustrates an electrophotographic-type color image forming apparatus equipped with image forming means for four colors, namely yellow (Y), magenta (M), cyan (C) and black (K). As shown in FIG. 1, the apparatus includes photosensitive drums 5Y, 5M, 5C, 5K for forming electrostatic latent images, charging units 7Y, 7M, 7C, 7K; developing units 8Y, 8M, 8C, 8K; toner vessels 11Y, 11M, 11C, 11K; laser scanners 10Y, 10M, 10C, 10K for performing exposure in accordance with an image signal and forming electrostatic images on the photosensitive drums 5Y, 5M, 5C, 5K, respectively; a transfer belt 12 for transferring and transporting, one after another, the toner images that have been formed on the photosensitive drums 5Y, 5M, 5C, 5K; primary transfer rollers 6Y, 6M, 6C, 6K for transferring, to the intermediate transfer belt 12, toner images visualized in accordance with the electrostatic latent images formed on the photosensitive drums 5Y, 5M, 5C, 5K by the developing units 8Y, 8M, 8C, 8K, respectively; a belt driving roller 18a, which is connected to a drive unit comprising a motor and gears (not shown), for driving the intermediate transfer bell 12; a belt-follower roller 18b that rotates in accordance with movement of the intermediate transfer belt 12 and applies a constant tension to the intermediate transfer belt 12; and a secondary transfer roller 9 for transferring the toner images, which have been transported by the intermediate transfer bell 12, to paper, in cooperation with an additional belt roller 18c.

The apparatus further includes paper-supply cassettes 32, 34, 36; a fixing unit 13 for thermally fusing and fixing the toner image that has been transferred to the paper; a flapper 27 for changing over the transport path in a case where the paper is supplied to a doubled-side unit; a sensor 22 for sensing a density sensing pattern that has been formed on the intermediate transfer belt 12; a sensor 39 for sensing the surface gloss or paper type; and a sensor 38 for sensing the tint of toner that has been fixed to the transfer medium 1. The arrows in FIG. 1 indicate the flow of the paper.

Figure 2:
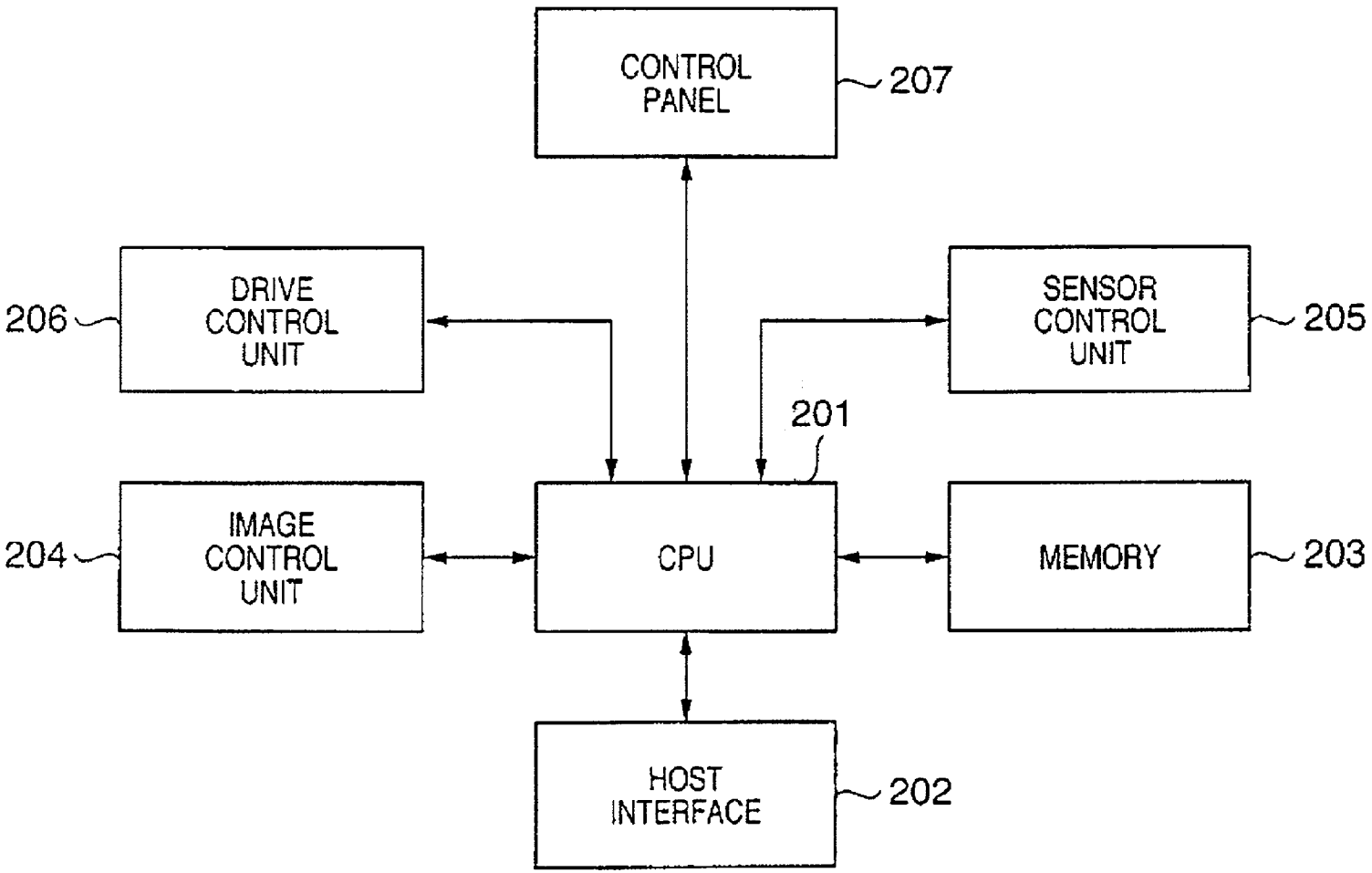
FIG. 2 is a diagram illustrating a controller in the image forming apparatus of the first embodiment.

FIG. 2 is a diagram illustrating a controller in the image forming apparatus of the first embodiment. As shown in FIG. 2, the controller includes a CPU 201 for controlling and managing the overall apparatus; a host interface 202 managing communication between the image forming apparatus (printer) and a host (personal computer); a memory 203 for holding print data, various parameters and various information; an image control unit 204 for converting print data, which has been sent from the personal computer to the printer, to data suited to the printing scheme of the printer engine; a sensor control unit 205 for sensing the status of each part of the printer; a drive control unit 206 for performing drive control such as control of actuators, lasers and high voltage of the printer engine; and a control panel 207 having a display unit for displaying printer information and an input unit whereby commands from the user are input.

In the arrangement described above, print data is sent from the personal computer to the printer via the host interface 202, conversion to data suited to the scheme of the printer engine is completed in the image control unit 204 and the data is held in the memory 203. If the printer is in the print-enabled state, the photosensitive drums 5Y–5K and intermediate transfer belt 12, which are connected to the driving means comprising the motor and gears (not shown), start being driven by the drive control unit 206, and the transfer medium 1 is supplied from any of the paper-feed cassettes 32, 34, 36 selected by pick-up rollers 33, 35, 37 and is transported to a registration roller 23 by transport rollers 24, etc.

If the transfer medium 1 is sensed by a pre-registration sensor 19, the sensor 39 senses the surface property of the transfer medium, thereby discriminating information relating to the characteristics of the transfer medium 1, such as the gloss and paper type, and stores the result in the memory 203 in the controller. Further, following discrimination, the image signals of each of the colors is sent to the laser scanners 10Y–10K of respective ones of the colors, electrostatic latent images are formed on the photosensitive drums 5Y–5K and the toner images, which have been visualized in accordance with the electrostatic latent images formed on the photosensitive drums 5Y–5K, by the developing units 8Y–8K, are transferred to the intermediate transfer belt 12 by the primary transfer rollers 6Y–6K.

In the arrangement shown in FIG. 1, images are formed successively in the order Y, M, C, K. Furthermore, the transfer medium 1 is supplied to the secondary transfer roller 9 in conformity with the image position on the intermediate transfer belt 12 and the timing thereof, the toner images are transferred to the transfer medium 1 and the toner images are thermally fixed to the transfer medium 1 by the fixing unit 13. The transfer medium 1 is then ejected from the apparatus.

Further, in the first embodiment, the gloss and paper type of the transfer medium 1 are sensed by the sensor 39 and the result is stored in the memory 203 of the controller. In a case where the sensor 39 senses a transfer medium whose gloss or paper type differs from that of the transfer medium stored in the memory 203 the last time, a density sensing sequence is executed, the sequence including forming a test pattern (patch) for sensing color on the transfer medium 1 and sensing the tint of the patch, after the patch has been fixed, by the sensor 38 disposed rearward of the fixing unit 13. Based upon the result of sensing, the calibration table for convening the image data is rewritten, thereby to correct the density-tone characteristic, and color stabilization control is carried out in such a maimer that an image of stabilized tint can be output irrespective of the transfer medium.

In the series of operations described, the circumstances within the apparatus are monitored by the sensor control unit 205 and overall control is exercised by the CPU 201.

The printing operation of the first embodiment will now be described in detail with reference to FIG. 3.

Figure 3:
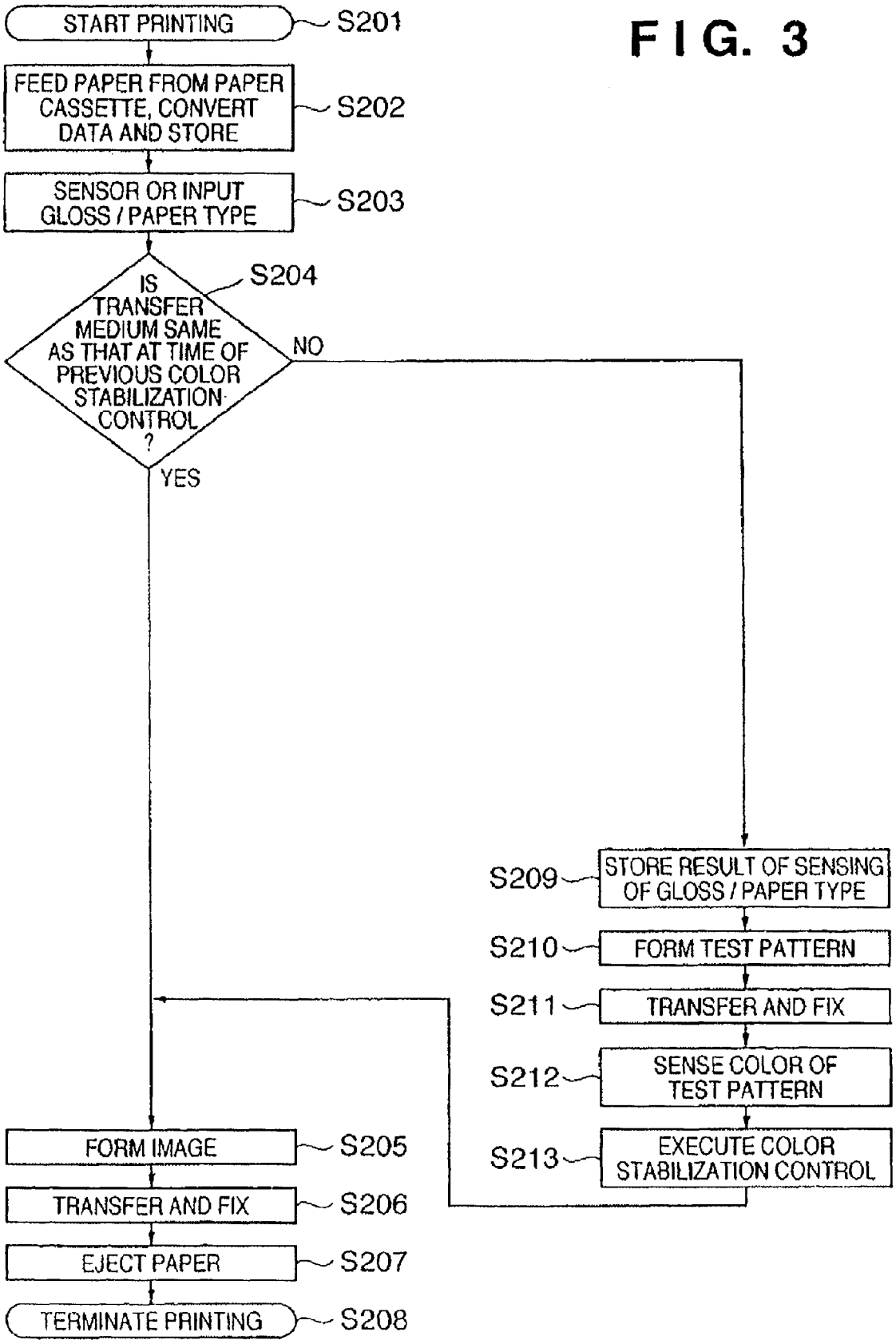
FIG. 3 is a flowchart illustrating print processing according to the first embodiment.

FIG. 3 is a flowchart illustrating print processing in the first embodiment. First, at step S201 (abbreviated to "S201" below), the CPU 201 starts the printing operation when print data is sent from a personal computer or the like via the host interface 202. Then, at S202, the transfer medium 1 is fed from the specified paper cassette and the print data is converted by the image control unit 204 to data suited to the printing scheme of the printer engine. Next, at S203, the gloss or paper type of the supplied transfer medium 1 is sensed by the sensor 39, then, at S204, a comparison is made with the result of sensing transfer-medium characteristics that prevailed the last time color stabilization control was performed, this result having been stored in the memory 203. If the compared results of the sensing operation are substantially the same, control proceeds directly to S205, where image formation (formation and development of the latent image) is carried out, then to S206, where transfer and fixing are performed, and then to S207, where the transfer medium 1 is ejected from the apparatus. The printing of one sheet is thus completed (S208).

On the other hand, if it is found at S204 that the result of sensing the gloss or paper type of the transfer medium 1 is such that a difference will appear in the tint of the image, then control proceeds to S209. Here the result of sensing the gloss or paper type of the transfer medium 1 is stored in the memory 203 and a transition is made to a sequence for color stabilization control. This sequence includes first forming a test pattern at S210, performing transfer and fixing at S211, then sensing the test pattern of the fixed toner by the sensor 38 at S212 and executing color stabilization control using the result of sensing. Control then proceeds to S205, where the original image to be printed is formed, Thus, the gloss of the transfer medium 1 is sensed by the sensor 39 and printing is executed as is if the gloss is approximately the same as the gloss of the transfer medium that underwent color stabilization control previously. If the gloss is different, color stabilization control is executed and then the original printing operation is carried out, whereby calibration can be performed automatically and an image of stabilized tint obtained without user intervention even when the transfer medium is a different transfer medium.

The sensing of gloss, sensing of tint of the fixed toner and color stabilization control will now be described in detail. First, the sensing of gloss will be described with reference to FIG. 4A. Illumination means 51 such as an LED is illustrated in FIG. 4A. The arrangement is such that light from the illumination means 51 illuminates the transfer medium 1 at an angle of 45° from the normal (the dashed line) to the transfer medium 1. Light-receiving means 52 such as a photodiode or phototransistor senses entrant light that has been positively reflected at an angle of −45° from the normal by the transfer medium 1. Further, a slit or lens (not shown) may be provided in front of the light-receiving means 52 as necessary and the positively reflected light may be sensed selectively.

In a case where the transfer medium 1 has a high gloss in this arrangement, the rate of positive reflection is high and a larger photoelectric current flows into the light-receiving means 52. If the gloss of the transfer medium 1 is low, however, the rate of positive reflection is low and only a small photoelectric current is produced in the light-receiving means 52.

Accordingly, the photoelectric current produced by the light-receiving means 52 is subjected to an I-V (current-voltage) conversion and impedance conversion using resistors and an operational amplifier (not shown), the result of the conversion is extracted as voltage, this is converted to a digital value by an AD (analog-digital) converter (not shown) and a size comparison is made to thereby determine the magnitude of gloss.

Figure 4B:
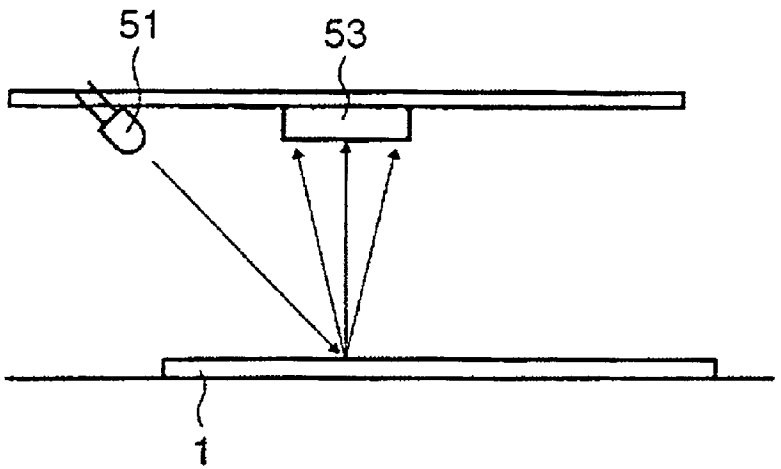
FIGS. 4A and 4B are diagrams useful in describing sensing means for sensing gloss and paper type of a transfer medium.
Figure 4A:
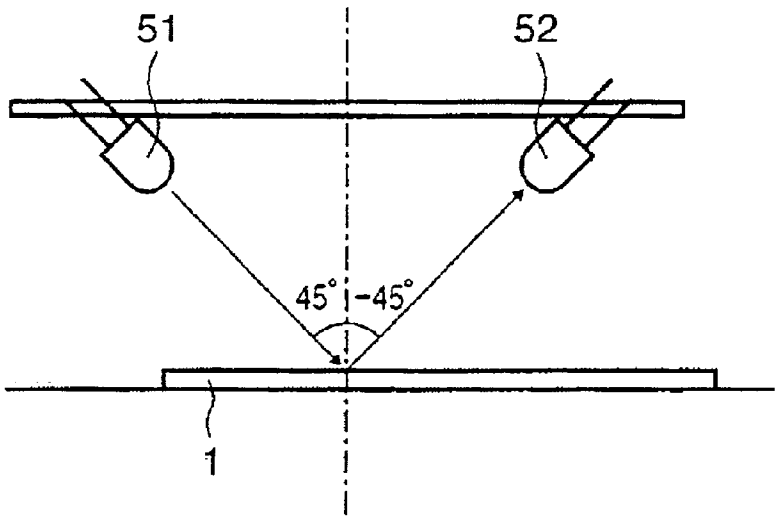

FIG. 4B is a diagram illustrating an example of a sensor for sensing the paper type of the transfer medium 1. Here illumination means 51 is the same as that in FIG. 4A. An area sensor 53 is constituted by a CMOS or CCD and images the surface of the transfer medium 1. Since light impinges obliquely upon the surface of the transfer medium 1 as illustrated, shadows are produced in accordance with the surface roughness of the transfer medium 1. This is sensed by the area sensor 53 so that the type of paper, such as plain paper, rough paper, glossy paper, coated paper or OHP, can be discriminated based upon depth of irregularities (which can be determined by the difference between maximum and minimum values output from a plurality of pixels, by way of example) or fineness of irregularities (which can be determined from the frequency of changeover between "1" and "0" when the sensor output is digitized). Since coated paper or gloss paper has a high reflectivity and plain paper or rough paper a low reflectivity, whether or not color stabilization control should be executed can be determined using the type of paper as a reference.

Figure 5:
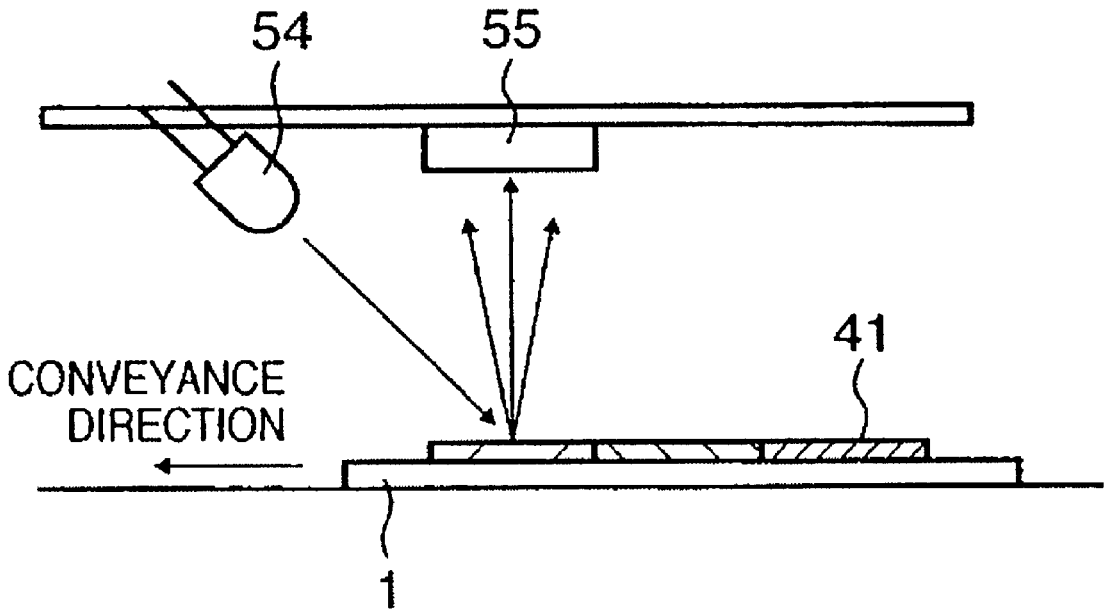
FIG. 5 is a diagram useful in describing sensing means for sensing the color of toner that has been fixed to a transfer medium.

Next, a method of sensing the tint of toner that has been fixed to the transfer medium 1 will be described in detail with reference to FIG. 5. Illustrated in FIG. 5 are illumination means 54 such as a white LED having a spectrum over the full range of visible light, and light-receiving means 55 that includes a plurality of photodiodes or phototransistors equipped with color filters for each of the colors R, G, B.

In this arrangement, which has a toner patch 41 fixed to the transfer medium 1 as a test pattern, the illumination means 54 illuminates the toner patch 41 with light inclined at an angle of 45° from the normal to the transfer medium 1, and the light-receiving means 55 senses light irregularly reflected in the direction along the normal. As a result, the RGB components contained in the reflected light can be obtained from results of sensing by the sensor provided with the filters for respective ones of R, G, B.

It should be noted that if any of the sensing means has a reference reflector provided at the sensing position, calibration of the sensing means can be performed without allowing the transfer medium 1 to pass through, This is a preferred arrangement.

Color stabilization control according to the first embodiment will now be described in detail. In the example of color stabilization control to be described, use is made of gray-axis control in which the process gray color of CMY is made to conform to the color of color-stabilized K toner.

Figure 6:
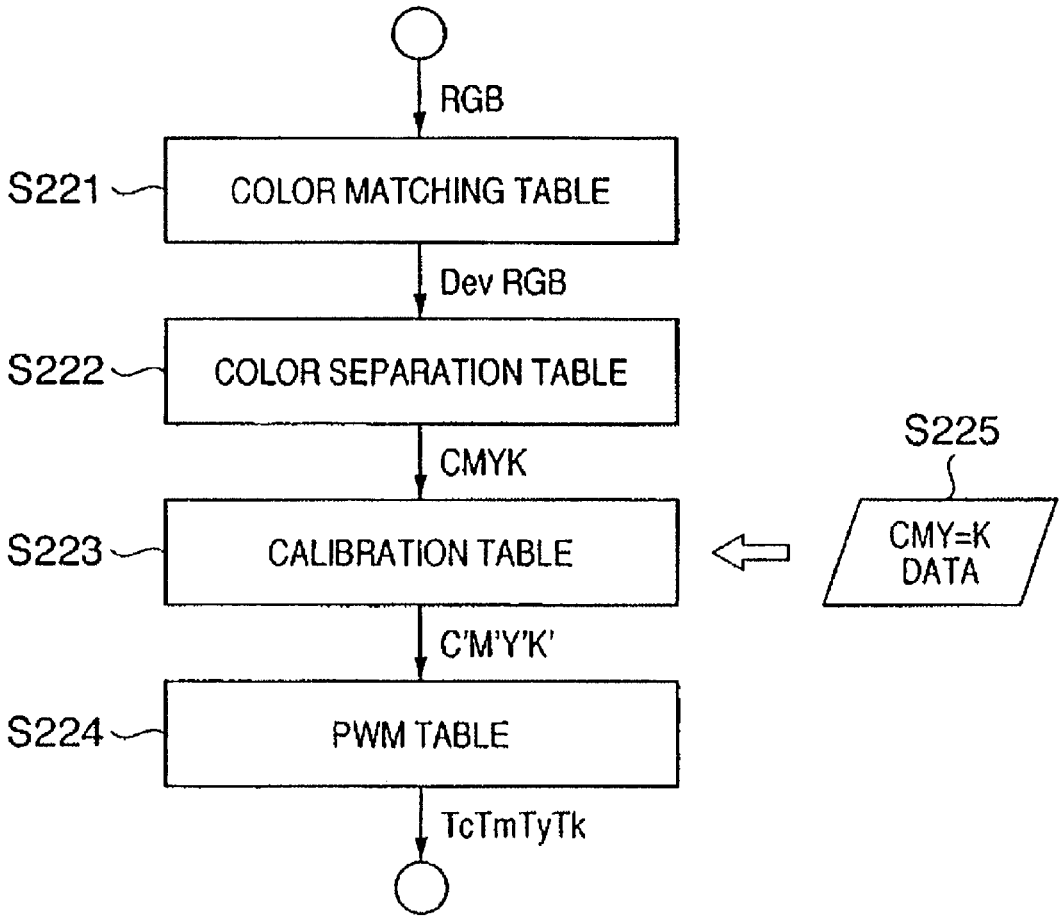
FIG. 6 is a diagram illustrating processing executed by an image controller.

The processing by the image control unit 204 will be described with reference to FIG. 6 before turning to a description of this color-stabilization control. In FIG. 6, S221 to S224 constitute an example of processing by the image control unit 204 of the color image forming apparatus.

First, at S221, a color matching table prepared in advance is used to convert an RGB signal, which represents the color of an image sent from a personal computer or the like, to a device RGB signal (referred to below as a "DevRGB signal") made to conform to the color reproduction region of the color image forming apparatus. Next, at S222, the DevRGB signal is convened to a CMYK signal, which represents the colors of the toner colorants used in the color image forming apparatus, by a color separation table prepared beforehand. Next, at S223, by using a calibration table that corrects a density-tone characteristic specific to each color image forming apparatus, the CMYK signal is subjected to the correction of the density-tone characteristic, whereby the signal is converted to a C'M'Y'K signal. This is followed by S224, where a PWM (Pulse-Width Modulation) table is used to effect a conversion to exposure times Tc, Tm, Ty, Tk of the scanners 10C, 10M, 10Y, 10K corresponding to the C'M'Y'K signal. The test pattern used in color stabilization control is as follows: A K patch of a certain gray level is combined with a plurality of CMY mixed-color patches obtained by changing, at the design stage, each color at a prescribed rate from a CMY mixture ratio that results in a tint identical with that of the K patch. Such combinations are formed in a plurality of tones as the test pattern used in control, By sensing these patches using the sensor 38, it is possible to find a CMY ratio for which the RGB components of light reflected from the K patch of each tone and the RGB components of reflected light from the CMY mixed-color patches will give the same result. A desired γ table can be obtained for the toner of each color by finding the CMY ratio for a plurality of tones. Color stabilization control can be achieved by correcting the above-mentioned calibration table (S225) using these results.

It should be noted that this embodiment has been described based upon a tandem-type image forming apparatus having a plurality of photosensitive drums. However, the present invention is not limited to this arrangement and may also be applied to a single-drum image forming apparatus or to an ink-jet printer.

Further, in the example shown in FIG. 1, the sensing means for sensing the gloss or paper type of the transfer medium is described as being placed directly in front of the pre-registration sensor 19. However, it goes without saying that placement is not limited to the pre-registration position and that each sensing means may be provided in the vicinity of each paper cassette to perform sensing before the start of transport. In such case sensing will be completed before the start of transport and therefore the formation and development of the latent image of the image to be created originally can be executed without any waiting time. This makes it possible to shorten the time it takes to complete the initial print.

In accordance with the first embodiment described above, the transfer medium is sensed by sensing means such as a gloss sensor or media sensor in a case where the transfer medium has a gloss or is of a paper type different from that previously, A test pattern is sensed by sensing means that senses the tint of toner after fixation, and color stabilization control is executed automatically by a command from the control unit. As a result, a stabilized image can be obtained even in a case where the apparatus outputs an image of the kind in which the tint of the image is affected by the background gloss, as in the case of a halftone.

[Second Embodiment]

A second embodiment according to the present invention will now be described in detail with reference to the drawings.

The first embodiment has been described with regard to a case where the gloss and paper type of a transported transfer medium are sensed and color stabilization control is performed automatically when the transfer medium differs from that subjected to color stabilization control immediately previously. However, a laser printer or copier usually is equipped with a plurality of paper-feed cassettes and paper-feed options and there are many occasions where a plurality of paper types are mixed and used together. In such cases the time during which printing cannot be performed increases owing to an increase in the frequency with which color stabilization control is performed. Further, many sheets of transfer medium on which test patterns are printed are produced. In a second embodiment, therefore, a control method that improves upon this problem is described. The control method shortens non-print time and suppresses the production of transfer media on which test patterns are printed.

The structure of the image forming apparatus according to the second embodiment is similar to that shown in FIG. 2 described in the first embodiment and need not be described again. Further, the structure of the controller shown in FIG. 2 and of the sensing means illustrated in FIGS. 4A, 4B and FIG. 5 also are similar and need not be described again.

A printing operation according to the second embodiment will be described in detail with reference to FIG. 7. Steps identical with those of FIG. 3 are designated by like step numbers and steps S214, S216, S217 are added anew.

Figure 7:
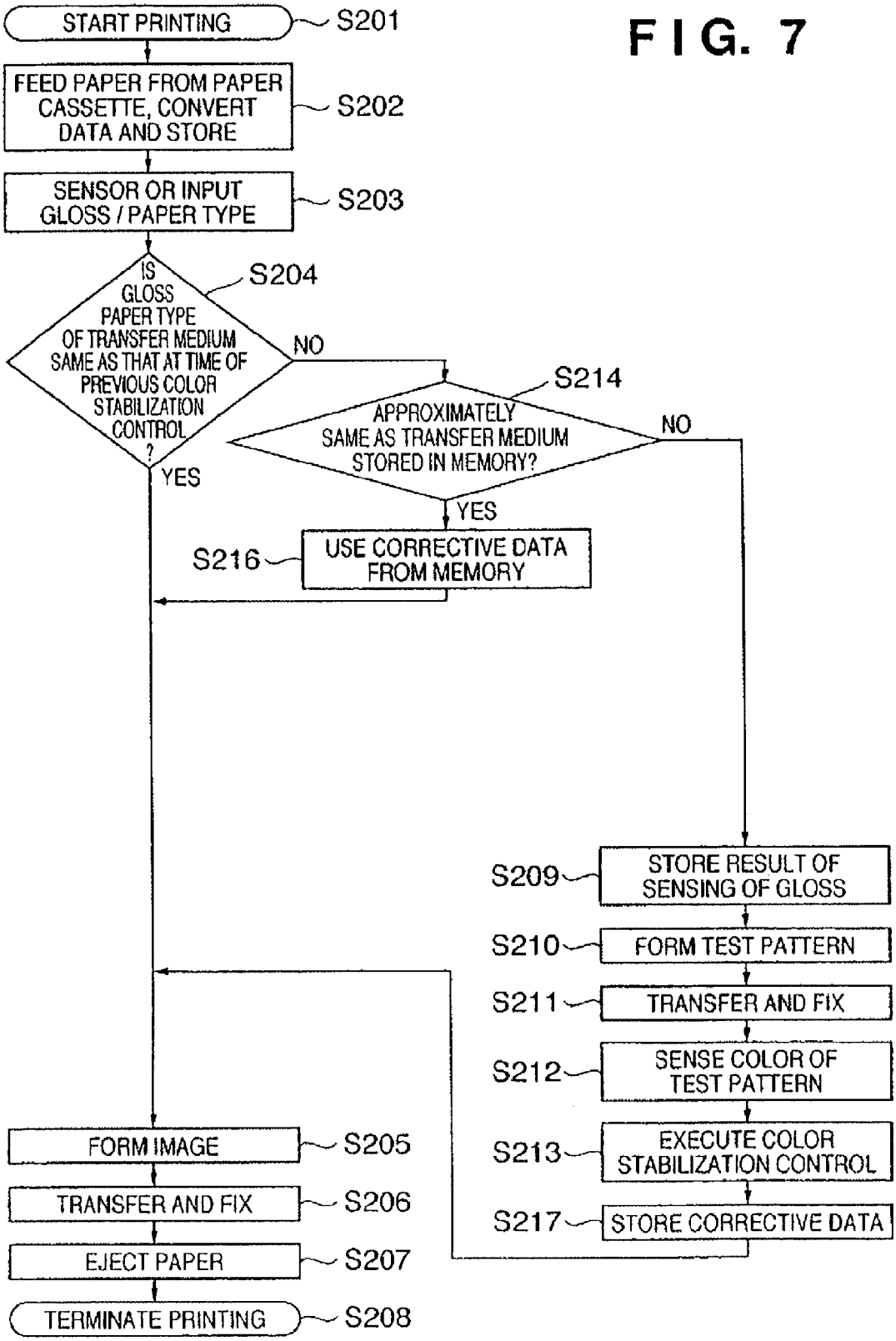
FIG. 7 is a flowchart illustrating print processing according to a second embodiment of the present invention.

FIG. 7 is a flowchart illustrating print processing according to the second embodiment. First, at S201, the CPU 201 starts the printing operation when print data is sent from a personal computer or the like via the host interface 202. Then, at S202, the transfer medium 1 is fed from the specified paper cassette and the print data is converted by the image control unit 204 to data suited to the printing scheme of the printer engine. Next, at S203, the gloss or paper type of the supplied transfer medium 1 is sensed by the sensor 39, then, at S204, a comparison is made with the result of sensing that prevailed the last time color stabilization control was performed, this result having been stored in the memory 203. If the compared results of the sensing operation are substantially the same, control proceeds directly to S205, where image formation (formation and development of the latent image) is carried out, then to S206, where transfer and fixing are performed, and then to S207, where the transfer medium 1 is ejected from the apparatus. The printing of one sheet is thus completed (S208).

On the other hand, if it is found at S204 that the result of sensing the gloss or paper type of the transfer medium 1 is such that a difference will appear in the tint of the image, then control proceeds to S214. Here it is determined whether data representing a transfer medium for which the result is approximately the same as that sensed at S203 has been stored in the results contained in the memory 203 of the controller.

If the data has not been stored in memory 203, control proceeds to S209, at which the result of sensing the gloss or paper type of the transfer medium 1 is stored in the memory 203 and a transition is made to a sequence for color stabilization control from S210 onward. After color stabilization control is executed, corrective data that has been obtained by color stabilization control is stored in the memory 203 at S217 in correspondence with the gloss and paper-type information sensed earlier at S203, and then the original image forming operation is carried out from S205 onward.

If it is found at S214 that the data corresponding to the transfer medium 1 has been stored in the memory 203, control proceeds to S216. Here use is made of the corrective data that has been obtained from the relevant transfer medium 1 recorded in the memory 203, and image formation is carried out from S205 onward.

Thus, according to the second embodiment, corrective data obtained by applying color stabilization control corresponding to the supplied transfer medium 1 is stored in the memory 203 for every type of transfer medium 1. If corrective data corresponding to the characteristic of the transfer medium 1 used when printing is carried out has not been stored in the memory 203, color stabilization control is executed. If the corrective data has been stored, on the other hand, then image formation is performed using this data. As a result, time during which printing of an image cannot be executed is minimized and an image having a stabilized tint can be obtained. It is possible to reduce wasting of the transfer medium used in color stabilization control.

Accordingly, a high-quality image can be obtained without causing the user to wait in a case where printing is performed by feeding transfer media of different gloss or paper type alternately from a plurality of paper-feed cassettes, and in a case where multiple users issue print requests simultaneously using transfer media of a plurality of different types.

[Third Embodiment]

A third embodiment of the present invention will now be described in detail with reference to the drawings.

The second embodiment is such that if corrective data has been stored in the memory 203, image formation is carried out using the corrective data. However, if after the acquisition of the corrective data stored in memory 203 there is a major change in the environment in which the image forming apparatus is used, e.g., a major change in temperature or humidity, or a consumable such as a toner vessel or developing unit is replaced by another, then there is a possibility that the stored corrective data may no longer be correct. A control method that solves this problem will be described as a third embodiment of the invention.

Figure 8:
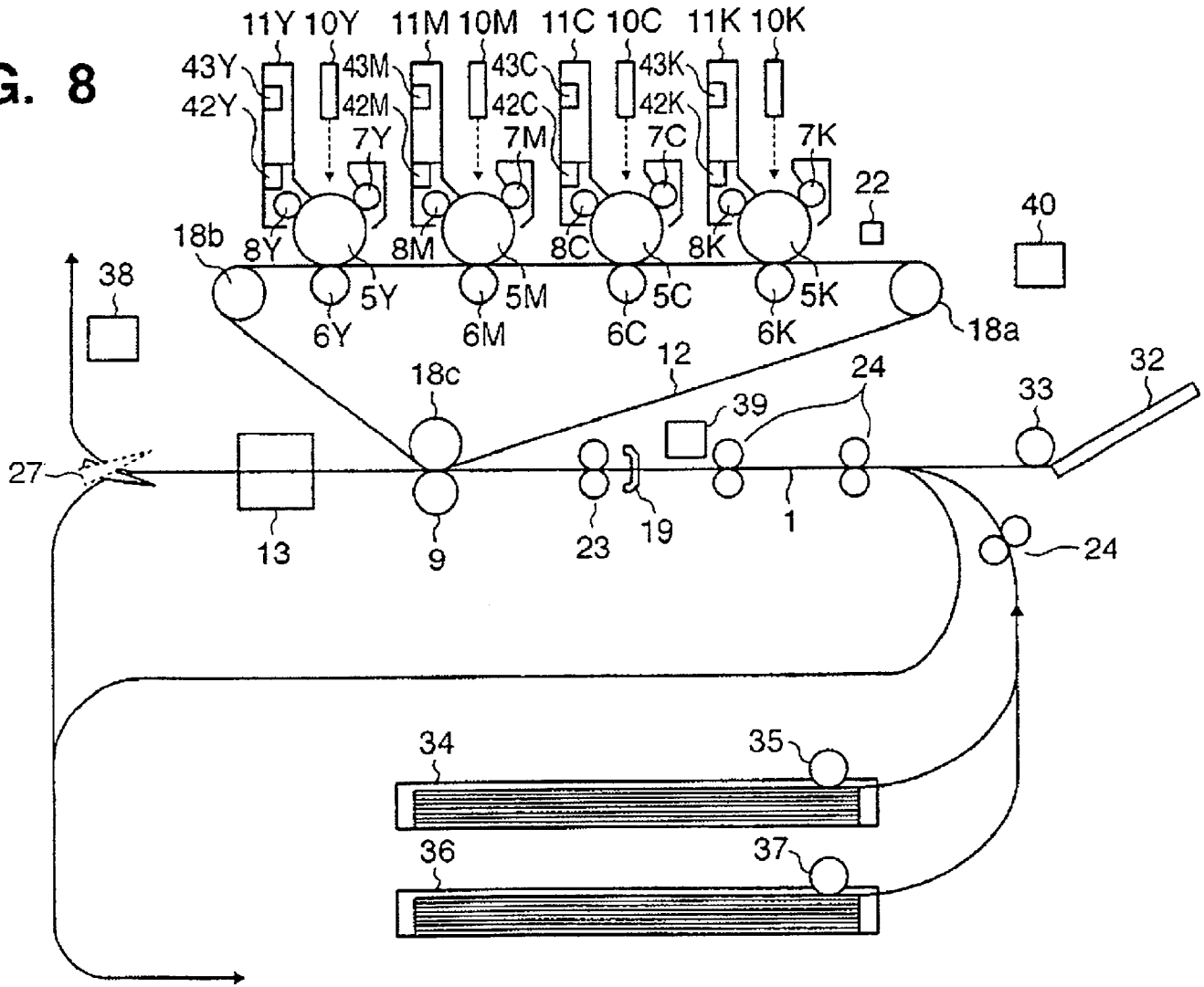
FIG. 8 is a diagram schematically illustrating the structure of an image forming apparatus according to a third embodiment of the present invention.

FIG. 8 is a diagram schematically illustrating the structure of an image forming apparatus according to the third embodiment. This embodiment differs from the first embodiment in that environment sensing means 40 is provided for sensing temperature or humidity within the image forming apparatus, recording means 42Y–42K, 43Y–43K such as bar codes or contact/non-contact tags are provided inside the developing units 8Y–8K or toner vessels 11Y–11K, and serial numbers or the like can be recorded. Of course, it is necessary that the image forming apparatus be provided with reading means (not shown) for reading the above. Other structural components of this embodiment are the same as those of the first embodiment described in conjunction with FIG. 1 and need not be described again.

The printing operation of the third embodiment will be described in detail with reference to FIG. 9. Steps identical with those of FIGS. 3 and 7 are designated by like step numbers and a step S215 is added anew.

Figure 9:
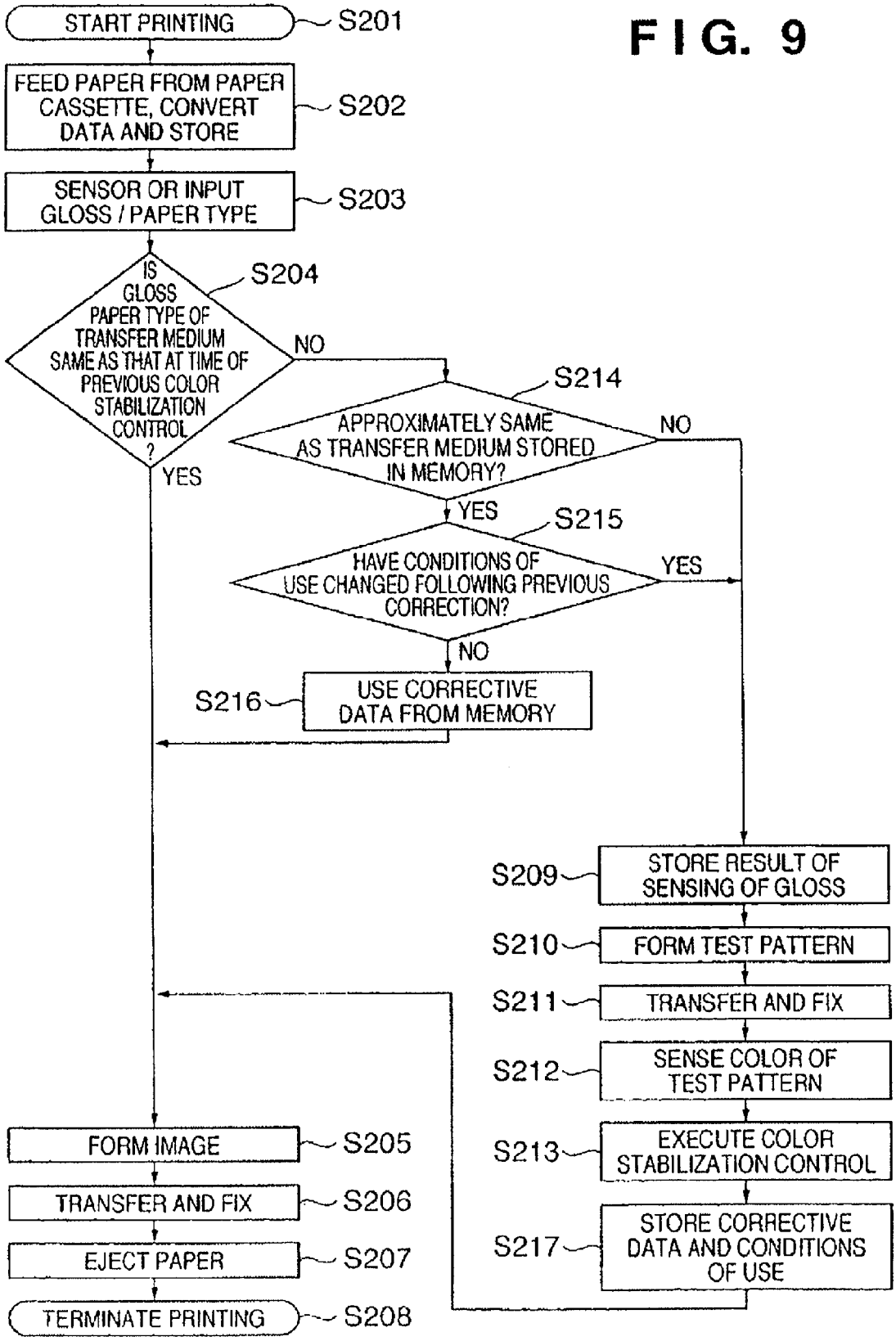
FIG. 9 is a flowchart illustrating print processing according to the third embodiment.

FIG. 9 is a flowchart illustrating print processing according to the second embodiment. First, at S201, the CPU 201 starts the printing operation when print data is sent from a personal computer or the like via the host interface 202. Then, at S202, the transfer medium 1 is fed from the specified paper cassette and the print data is converted by the image control unit 204 to data suited to the printing scheme of the printer engine. Next, at S203, the gloss or paper type of the supplied transfer medium 1 is sensed by the sensor 39, then, at S204, a comparison is made with the result of sensing that prevailed the last time color stabilization control was performed, this result having been stored in the memory 203. If the compared results of the sensing operation are substantially the same, control proceeds directly to S205, where image formation (formation and development of the latent image) is carried out, then to S206, where transfer and fixing are performed, and then to S207, where the transfer medium 1 is ejected from the apparatus. The printing of one sheet is thus completed (S208).

On the other hand, if it is found at S204 that the result of sensing the gloss or paper type of the transfer medium 1 is such that a difference will appear in the tint of the image, then control proceeds to S214.

If the data has not been stored in memory 203, control proceeds to S209, at which the result of sensing the gloss or paper type of the transfer medium 1 is stored in the memory 203 and a transition is made to a sequence for color stabilization control from S210 onward. After color stabilization control is executed, corrective data that has been obtained by color stabilization control is stored in the memory 203 at S217 in correspondence with information relating to gloss and paper type of the transfer medium 1 and conditions under which the image forming apparatus is currently being used. The original image forming operation is then carried out from S205 onward.

If it is found at S214 that the data corresponding to the transfer medium 1 has been stored in the memory 203, control proceeds to S215. Here it is determined whether the conditions in which image forming apparatus is used have changed since acquisition of the above-mentioned data. Specifically, the environment sensing means 40 determines whether a change in conditions of use that would cause a change in image quality has occurred. Examples of such a change are a major fluctuation in temperature and humidity and replacement (determined by serial number) of a developing unit or toner vessel. If the result is that there has been no change in conditions of use, then control proceeds to S216. Here use is made of the corrective data that has been obtained from the relevant transfer medium 1 recorded in the memory 203, and image formation is carried out from S205 onward.

If a change in conditions of use has been found at S215, then control proceeds to S209, the result of sensing the transfer medium 1 is stored in memory 203 and a transition is made to the sequence for color stabilization control from S210 onward. After color stabilization control is executed, corrective data that has been obtained by color stabilization control is stored in the memory 203 at S217 and the original image forming operation is carried out from S205 onward.

Thus, the third embodiment is such that if the transfer medium 1 has been the object of color stabilization control in the past and the conditions in which the image forming apparatus is used have not changed since execution of color stabilization control, then image formation is carried out using the corrective data that has been stored in the memory 203. On the other hand, if there is a newly sensed transfer medium or if there is a change in conditions of use after execution of color stabilization control in the past, then image formation is carried out after executing color stabilization control. As a result, the length of time during which printing of an image required by the user is halted can be suppressed and an image having stabilized tint can be obtained.

Accordingly, a high-quality image can be obtained without causing the user to wait in a case where printing is performed by feeding transfer media of different gloss or paper type alternately from a plurality of paper-feed cassettes, and in a case where multiple users issue print requests simultaneously using transfer media of a plurality of different types.

It goes without saying that it is possible to adopt an arrangement in which a step identical with that of S215 of determining whether there has been a change in conditions of use is inserted following the determination of an approximately identical transfer medium at S204, control proceeds to S209 and color stabilization control is carried out if the transfer medium is the same as that of the previous printing operation and the conditions of use of the image forming apparatus have changed, and printing is performed as is if the conditions of use have not changed.

[Fourth Embodiment]

A fourth embodiment of the present invention will now be described in detail with reference to the drawings.

In the first to third embodiments, color stabilization control is performed automatically when there is a change in gloss or paper type of the transfer medium. However, there are cases where forming a test pattern on paper and performing correction automatically is not always advantageous for the user, as when an image is formed on a special transfer medium or costly transfer medium, or when an image such as text that does not require stringent control of tint is formed, or when printing must be performed quickly. A control method for dealing with this situation will be described as a fourth embodiment.

A printing operation according to the third embodiment will be described with reference to FIG. 10. This processing differs from that of the third embodiment in that steps S218 and S219 are added. Steps S218 and S219 may also be added to the first and second embodiments.

Figure 10:
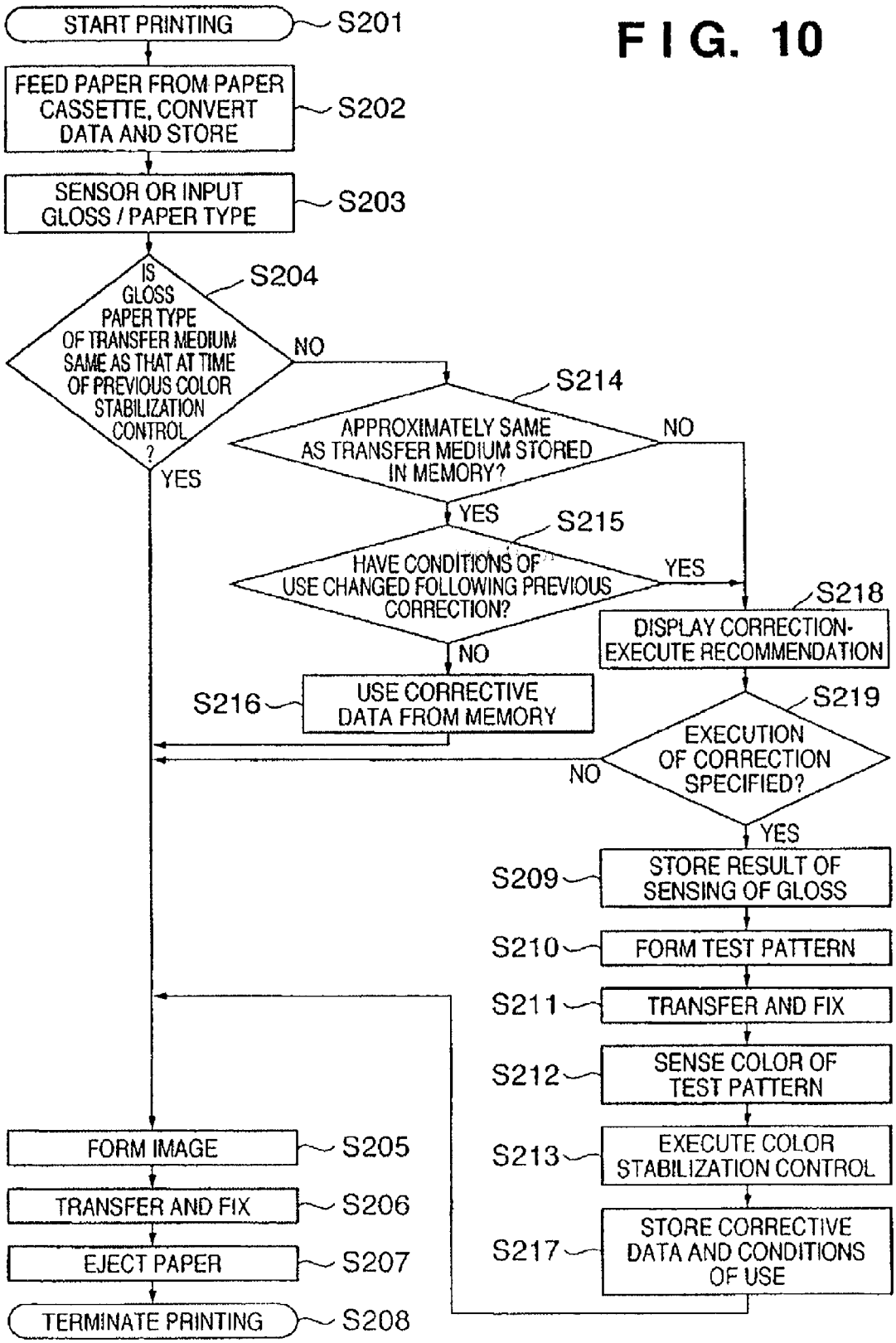
FIG. 10 is a flowchart illustrating print processing according to a fourth embodiment of the present invention.

FIG. 10 is a flowchart illustrating print processing according to the fourth embodiment. The transfer medium fed is sensed as described in the first to third embodiments. If it is determined that color stabilization control is necessary, control proceeds to S218. Here according to the fourth embodiment, color stabilization control is not executed automatically. Instead, a display recommending execution of color stabilization control is presented on the display unit of the control panel 207 and the user is allowed to enter, from keys on the control panel 207, whether color stabilization control is to be executed or not. If it is determined at S219 that the user has specified execution of color stabilization control, then, in a manner similar to that of the first to third embodiments, the original image formation is performed after color stabilization control is executed. If it is found at S219 that the user has not specified execution of color stabilization control, the original image formation is performed as is.

Thus, if a transfer medium whose gloss or paper type differs from that used heretofore is supplied, whether or not color stabilization control should be executed is decided at the volition of the user. As a result, in case of a special transfer medium, a costly transfer medium or formation of an image such as text that does not require stringent control of tint, it is possible to avoid the problem of consumption of transfer media unwanted by the user and the problem of waiting time necessary for correction. Color stabilization control can be executed by the user as needed and an image of stable tint can be obtained.

[Modification]

Figure 11:
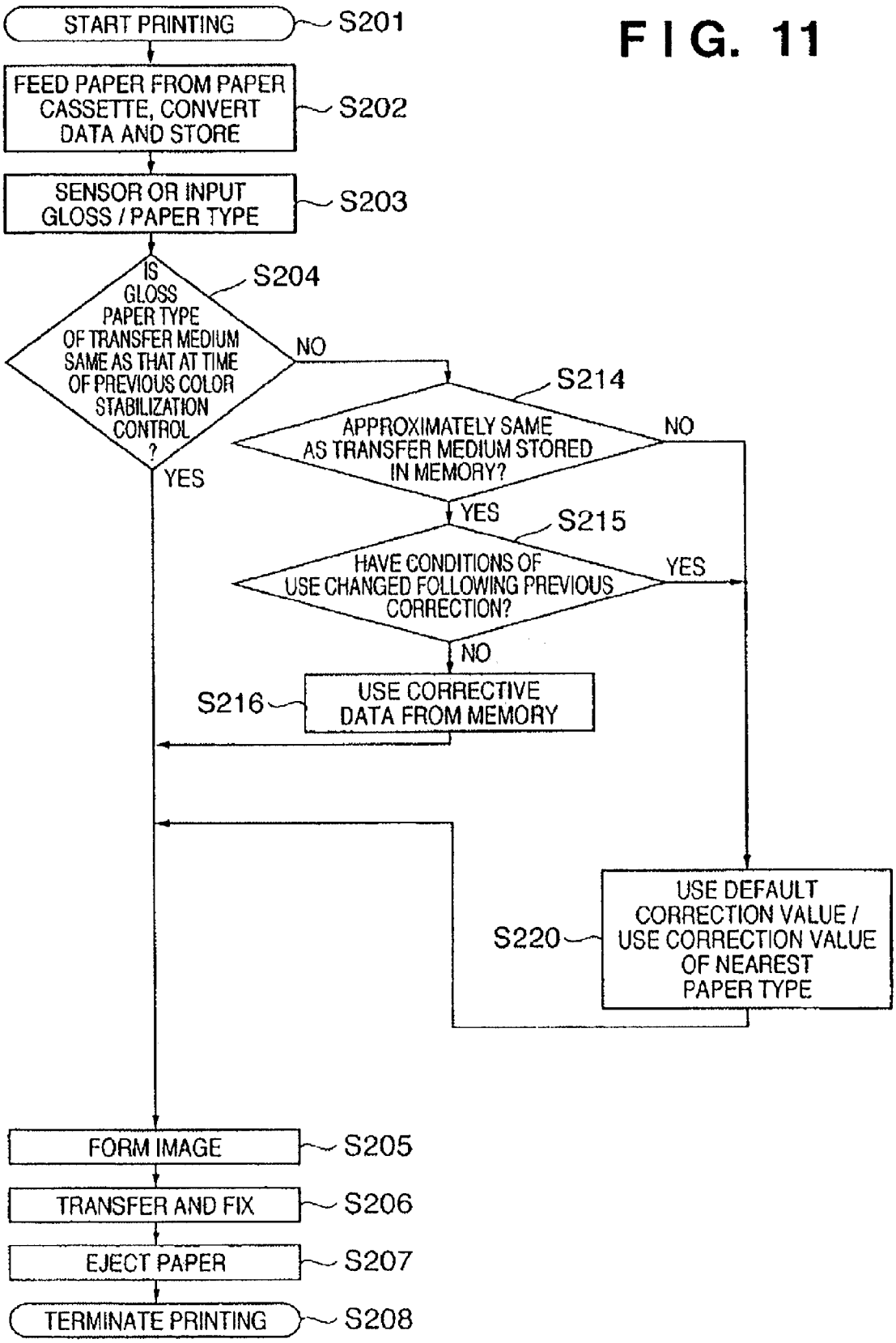
FIG. 11 is a flowchart illustrating print processing according to a modification.
Figure 12:
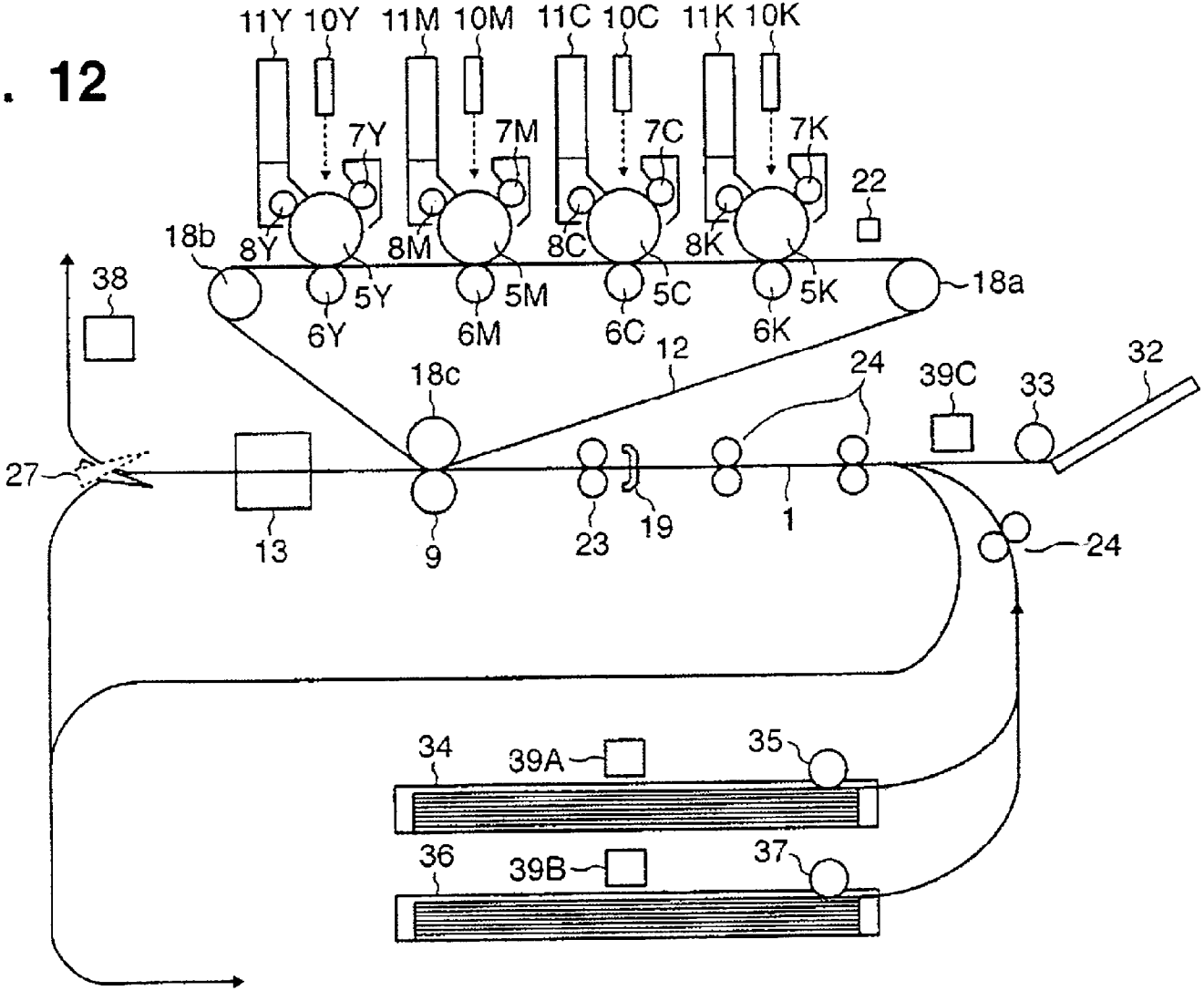
FIG. 12 is a diagram illustrating a modification of a sensor arrangement.

A modification of the above embodiments will be described with reference to FIG. 11. This modification differs from the first to fourth embodiments in that when color stabilization control is judged to be necessary, stabilization control is not executed automatically. Rather, at S220 shown in FIG. 11, a display is presented on the display unit of the control panel 207 and indicates whether to use a default correction value (a value stored in memory 203 in advance) or the correction value of a transfer medium having the closest gloss or paper type among those stored in the memory 203, and the user makes an entry from an input unit to specify which value should be used. This processing makes it possible to provide the user with an image having a tint exhibiting some degree of suitability, though the image may not be ideal. It is also unnecessary for the user to wait for execution of color stabilization control.

This modification illustrates a case where execution of color stabilization control is presented on the display unit of the control panel 207 and a command is entered from an input unit. However, use of the control panel 207 is not a limitation and it goes without saying that it may be so arranged that the CPU 201 of the controller presents a display on the personal computer of the user and the user enters the command from the personal computer.

Further, in the first to fourth embodiments, an example in which the gloss or paper type of a transfer medium is sensed using the sensor 39 is described. However, it may be so arranged that the user enters the type of transfer medium from the control panel 207 or personal computer, and the sensor 39 is not essential. In such case S203 becomes unnecessary and it will suffice if the data relating to the type of paper entered by the user is stored in memory at S209.

Furthermore, an optical sensor for observing positively reflected light and an optical sensor for imaging a transfer medium and sensing the degree of surface roughness thereof have been described as examples of sensing means for sensing gloss and paper type of a transfer medium. It goes without saying, however, that the invention is not limited to these two arrangements. By using various sensors instead of the sensors employed in the above embodiments, the characteristic information of a transfer medium can be determined instead of gloss by transmitted light or reflected light.

Further, with regard to sensing means for sensing the tint of an image formed on a transfer medium, a case where a white LED is adopted as the light source and sensing is performed by a plurality of optical sensors provided with RGB filters has been described by way of example. However, this does not impose a limitation upon the invention and it goes without saying that, in general, any sensor that is capable of sensing tint will suffice. For example, it is possible to adopt a scheme in which a spectral element is provided instead of a filter, the image of spectrally diffracted light is formed on a line sensor and a spectrum of reflected light is obtained, and it is also possible to illuminate toner successively by a plurality of light sources of different wavelengths and sense signals in a time series by a single sensor.

Further, a monocular infrared sensor may be used rather than a color sensor.

Further, the sensor 39 for sensing the characteristic of the transfer medium need not necessarily be placed directly in front of the registration roller 23 in the manner shown in FIGS. 1 and 8. For example, it may be so arranged that the present invention is implemented page by page when continuous printing is performed. This can be accomplished by placing sensors at 39A, 39B, 39C at the paper-feed openings, such as inside the paper-feed cassettes or immediately downstream. Even with such an arrangement, throughput from the second page onward will not decline.

It should be noted that even if the sensor is placed immediately in front of the registration roller 23, as shown in FIGS. 1 and 8, throughput from the second page onward will not decline if it is so arranged that the present invention is executed only for the top page in case of continuous printing.

The present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium on which have been recorded the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media that can be used for supplying the program code are a floppy disk, hard disk, optical disk, magneto-optical disk, CD-ROM, CD-R, magnetic tape, non-volatile type memory card or ROM, etc, Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the recording medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

Thus, in accordance with the present invention, an image of stabilized color tint can be output even if a supplied transfer medium is changed to a transfer medium of a different gloss or type of paper.

Further, an image of stabilized color tint can be output without exercising color stabilization control each time in a case where a supplied transfer medium is changed to a transfer medium of a different gloss or type of paper.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-366316 filed on Oct. 27, 2003, the entire contents of which are hereby incorporated by reference herein.

What is claimed is:

1. A method of controlling an image forming apparatus for forming an image on a transfer medium, comprising:

a determination step of determining that a characteristic of the transfer medium has changed;

an entering step for allowing an operator to enter whether or not a density sensing sequence is to be executed, based upon the determination of the change in the characteristic of the transfer medium;

a step of executing the density sensing sequence in a case where the fact that said sequence is to be executed has been entered, the density sensing sequence including a sensing step of forming an image, which is for sensing density, on the transfer medium, and sensing this density-sensing image on the transfer medium; and a step of deciding image forming conditions of the image forming apparatus based upon a result of sensing density in the density sensing sequence.

2. The method according to claim 1, wherein said determination step includes determining the characteristic of the transfer medium using a sensor for sensing surface gloss of the transfer medium.

3. The method according to claim 1, wherein said determination step includes a step of determining that the characteristic of the transfer medium has changed by allowing a user to enter information relating to the characteristic of the transfer medium.

4. The method according to claim 1, further comprising:

a step of storing the image forming conditions that have been decided; and a correcting step of correcting image forming conditions based upon the stored image forming conditions corresponding to the determined characteristic of the transfer medium.

5. The method according to claim 1, wherein if the fact that the density sensing sequence is not to be executed has been entered, then the image forming conditions are corrected in said correcting step based upon the stored image forming conditions corresponding to the determined characteristic of the transfer medium.

6. The method according to claim 1, wherein the density sensing sequence includes a sensing step of forming the density-sensing image on the transfer medium and sensing tint of the density-sensing image using a sensor for sensing, on a per-color-component basis, density of the density-sensing image on the transfer medium.

7. The method according to claim 1, wherein the image forming conditions are data in a calibration table for converting image data.

8. A computer-readable recording medium on which is recorded, in executable form, a program for causing a computer to execute each step of the control method set forth in claim 1.

9. An image forming apparatus comprising:

an image forming unit adapted to form an image on a transfer medium;

a sensor adapted to sense an image, which is for sensing density, formed by said image forming unit;

a control unit adapted to decide image forming conditions of said image forming unit based upon a result of sensing by said sensor;

a determination unit adapted to determine that a characteristic of the transfer medium has changed; and input means for allowing an operator to enter whether or not a density sensing sequence is to be executed, based upon the determination of the change in the characteristic of the transfer medium;

said apparatus executing the density sensing sequence in a case where the fact that the sequence is to be executed has been entered, the density sensing sequence including forming the image, which is for sensing density, on the transfer medium, and sensing this density-sensing image on the transfer medium using said sensor.

10. The apparatus according to claim 9, further comprising a sensor adapted to sense surface gloss of the transfer medium;

wherein said determination unit determines a change in the characteristic of the transfer medium based upon an output of said sensor.

11. The apparatus according to claim 9, wherein said input means is also for allowing an operator to enter information relating to the characteristic of the transfer medium, wherein said determination unit determines a change in the characteristic of the transfer medium based upon an output of said input unit.

12. The apparatus according to claim 9, further comprising a storage unit adapted to store the image forming conditions that have been decided, wherein said apparatus corrects the image forming conditions based upon the stored image forming conditions corresponding to the determined characteristic of the transfer medium.

13. The apparatus according to claim 9, wherein if the fact that the density sensing sequence is not to be executed has been entered, then said apparatus corrects the image forming conditions based upon the stored image forming conditions corresponding to the determined characteristic of the transfer medium.

14. The apparatus according to claim 9, wherein said sensor is capable of sensing tint of the density-sensing image by sensing, on a per-color-component basis, density of the density-sensing image on the transfer medium.

15. The apparatus according to claim 9, wherein the image forming conditions are data in a calibration table for convening image data.

*16. A color image forming apparatus for forming a test pattern on a transfer medium and stabilizing tint based on a result of sensing the test pattern fixed on the transfer medium by a fixing unit, comprising:*

*a sensing unit that automatically senses the test pattern fixed on the transfer medium, on the way of conveying path which the transfer medium is conveyed after an image is fixed on the transfer medium and before the transfer medium is discharged;*

*a color stabilization controller that executes a color stabilization control of obtaining corrective data, for correcting an image signal to stabilize tint, based on a result of sensing by the sensor;*

*a storage controller that controls a storage operation of the corrective data into a storage, wherein the corrective data according to each of a plurality of types of the transfer medium can be read from the storage;*

*an image forming unit that forms the image based on the corrective data stored in the storage; and*

*a recognition unit that recognizes a type of the transfer medium,*

*wherein the corrective data, which is able to read from the storage and according to each type of the transfer medium, is according to the controlling by the storage controller which controls the storage operation of the corrective data obtained by the color stabilization controller, so as to be able to form the image by the image forming unit based on the corrective data according to the type of the transfer medium recognized by the recognition unit from the plurality of types of the transfer medium, and*

*even if the color stabilization control is not executed again by the color stabilization controller, the corrective data according to the type of transfer medium recognized by the recognition unit from the plurality of types of transfer medium is read from the storage and the image is formed by the image forming unit.*

*17. A color image forming apparatus for forming a test pattern on a transfer medium and stabilizing tint based on a result of sensing the test pattern fixed on the transfer medium by a fixing unit, comprising:*

*a sensor that automatically senses the test pattern fixed on the transfer medium, on the way of conveying path which the transfer medium is conveyed after an image is fixed on the transfer medium before the transfer medium is discharged;*

*a color stabilization controller that executes a color stabilization control of obtaining corrective data, for correcting an image signal to stabilize tint based on a result of sensing by the sensor;*

*a storage that automatically stores the corrective data such that the corrective data can be specified in accordance with the type of transfer medium;*

*a recognition unit that recognizes a type of transfer medium; and*

*an image forming unit that forms the image using corrective data, which is specified in accordance with the type of transfer medium recognized by the recognition unit in a plurality of pieces of the corrective data stored in the storage.*

*18. The apparatus according to claim 17, wherein a patch of black and mixed-color patches of cyan, magenta and yellow are included in the test pattern, and a mixture ratio of cyan, magenta and yellow in the mixed-color patches is obtained by the color stabilization control such that tint of the mixed-color patches matches tint of the patch of black.*

*19. The apparatus according to claim 17, further comprising an update unit that updates the corrective data being*

*readable from the storage by putting the sensor and the color stabilization controller in action.*

*20. The apparatus according to claim 19, wherein the update unit comprises a determination unit that determines whether or not to execute the update based on the change of use conditions of the color image forming apparatus.*

*21. The apparatus according to claim 17, further comprising an update unit that stores corrective data obtained by the color stabilization control such that the obtained corrective data can be specified in accordance with the type of changed transfer medium, by putting the sensor and the color stabilization controller in action, according to the recognition of the change of the type of transfer medium by the recognition unit.*

*22. A color stabilization control method of a color image forming apparatus for forming a test pattern on a transfer medium and stabilizing tint based on a result of sensing the test pattern fixed on the transfer medium by a fixing unit, comprising:*

*a sensing step of automatically sensing the test pattern fixed on the transfer medium, on the way of conveying path which the transfer medium is conveyed after an image is fixed on the transfer medium and before the transfer medium is discharged;*

*a color stabilization control step of executing a color stabilization control of obtaining corrective data, for correcting an image signal to stabilize tint, based on the result of sensing in the sensing step;*

*a storage control step of controlling a storage operation of the corrective data into a memory, wherein the corrective data according to each of a plurality of types of the transfer medium can be read from the memory;*

*an image forming step of forming the image based on the corrective data stored in the memory; and*

*a recognition step of recognizing a type of the transfer medium,*

*wherein the corrective data, which is able to read from the memory according to each type of the transfer medium, is according to the controlling in the storage control step which controls the storage operation of the corrective data obtained in the color stabilization control step, so as to be able to form the image in the image forming step based on the corrective data according to the type of the transfer medium recognized in the recognition step from the plurality of types of the transfer medium, and*

*even if the color stabilization control is not executed again in the color stabilization control step, the corrective data according to the type of transfer medium recognized in the recognition step from the plurality of types of transfer medium is read from the memory and the image is formed in the image forming step.*

*23. A color stabilization control method of a color image forming apparatus for forming a test pattern on a transfer medium and stabilizing tint based on a result of sensing the test pattern fixed on the transfer medium by a fixing unit, comprising:*

*a sensing step of automatically sensing the test pattern fixed on the transfer medium, on the way of conveying path which the transfer medium is conveyed after an image is fixed on the transfer medium before the transfer medium is discharged until an image is fixed and discharged on the transfer medium;*

*a color stabilization control step of executing a color stabilization control of obtaining corrective data, for correcting an image signal to stabilize tint based on the result of sensing in the sensing step;*

*a storing step of automatically storing the corrective data in a memory such that the corrective data can be specified in accordance with the type of transfer medium;*

*a recognition step of recognizing a type of transfer medium; and*

*an image forming step of forming the image using corrective data, which is specified in accordance with the type of transfer medium recognized in the recognition step in a plurality of pieces of the corrective data stored in the memory.*

*24. The method according to claim 23, wherein a patch of black and mixed-color patches of cyan, magenta and yellow are included in the test pattern, and a mixture ratio of cyan, magenta and yellow in the mixed-color patches is obtained by the color stabilization control such that tint of the mixed-color patches matches tint of the patch of black.*

*25. The method according to claim 23, further comprising an update step of updating the corrective data being readable from the memory by executing the sensing step and the color stabilization control step.*

*26. The method according to claim 25, wherein the update step comprises a determination step of determining whether or not to execute the update based on the change of use conditions of the color image forming apparatus.*

*27. The method according to claim 23, further comprising an update step of storing corrective data obtained by the color stabilization control such that the obtained corrective data can be specified in accordance with the type of changed transfer medium, by executing the sensing step and the color stabilization control step, according to the recognition of the change of the type of transfer medium in the recognition step.*

* * * * *